(12) United States Patent
Gregory

(10) Patent No.: US 8,713,928 B2
(45) Date of Patent: May 6, 2014

(54) DYNAMICALLY TUNED WAVE ENERGY CONVERTER

(76) Inventor: Bruce Gregory, London (GB)

( * ) Notice: Subject to any disclaimer, the term of this patent is extended or adjusted under 35 U.S.C. 154(b) by 763 days.

(21) Appl. No.: 12/884,792

(22) Filed: Sep. 17, 2010

(65) Prior Publication Data

US 2011/0089689 A1    Apr. 21, 2011

(30) Foreign Application Priority Data

Sep. 18, 2009  (GB) .................................. 0916518.4
Aug. 16, 2010  (GB) .................................. 1013675.2

(51) Int. Cl.
*F03B 13/14* (2006.01)
(52) U.S. Cl.
USPC .................................. 60/398; 60/497; 60/499
(58) Field of Classification Search
USPC ................ 60/398, 497, 499, 501; 290/42, 53; 415/916; 73/460; 185/29, 30, 32
See application file for complete search history.

(56) References Cited

U.S. PATENT DOCUMENTS

| 1,545,504 A * | 7/1925 | Lilley ............................. 185/30 |
| 2008/0224472 A1 * | 9/2008 | Bean ............................... 290/42 |
| 2010/0237631 A1 * | 9/2010 | Yu ................................. 290/1 R |

* cited by examiner

*Primary Examiner* — Edward Look
*Assistant Examiner* — Logan Kraft

(57) ABSTRACT

A wave energy converter comprises a pitching floating vessel and means for converting the pitching motion to electrical power.
By varying the distribution of the ballast mass in the vessel and by varying the vessel's immersed length the moments of inertia of mass and of added mass are varied and wave-bridging is controlled.
The immersed length of the vessel is varied by changing the draft of a v-shaped hull. Roll and yaw are suppressed by a vertical fin held at a substantial depth
Inside the vessel is a compact pendulum that is a combination of tracked and folding pendulums.
Both vessel and compact pendulum can be simultaneously and dynamically tuned over the range of periods that characterize high-energy ocean swells.

18 Claims, 10 Drawing Sheets

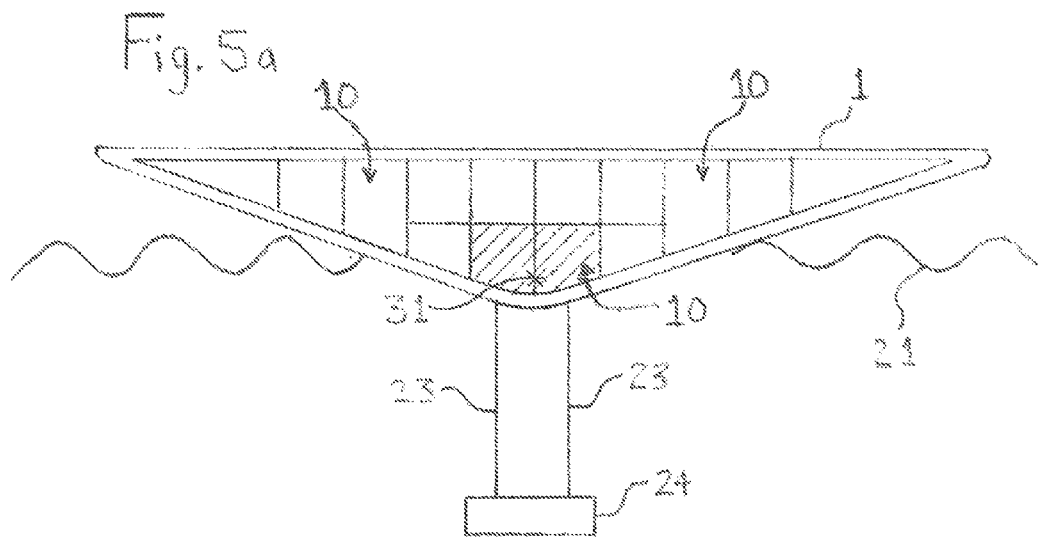
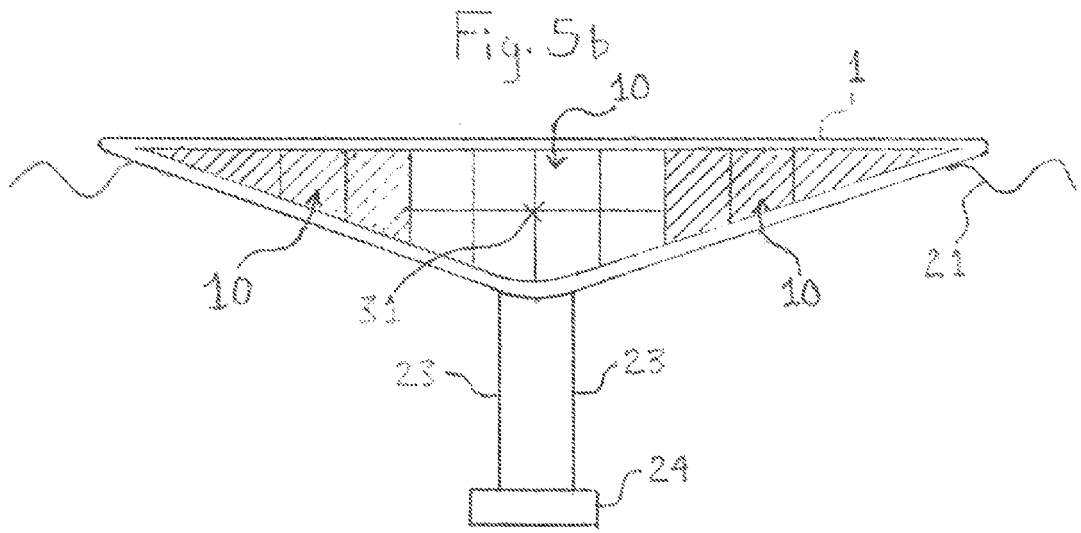
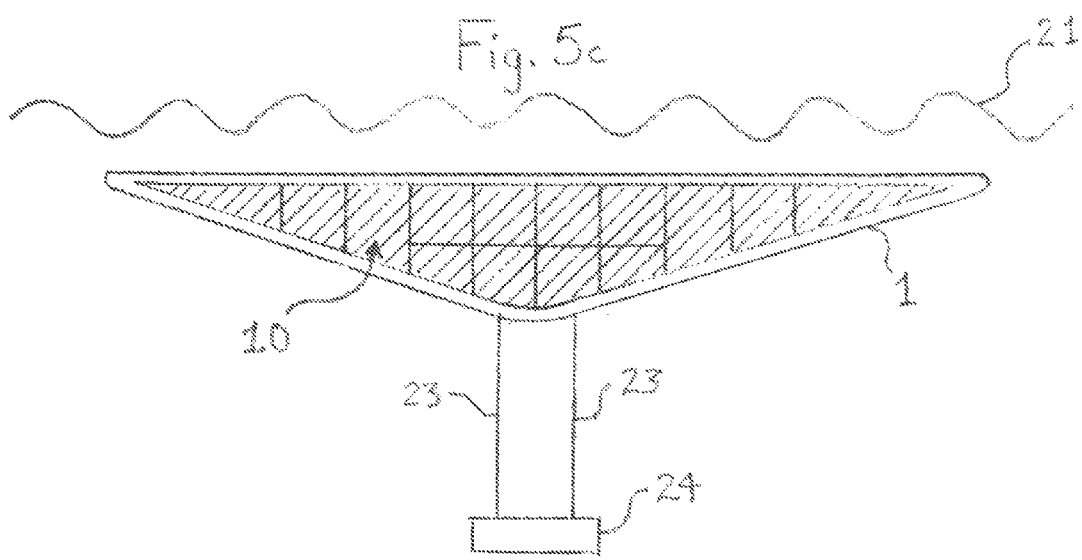

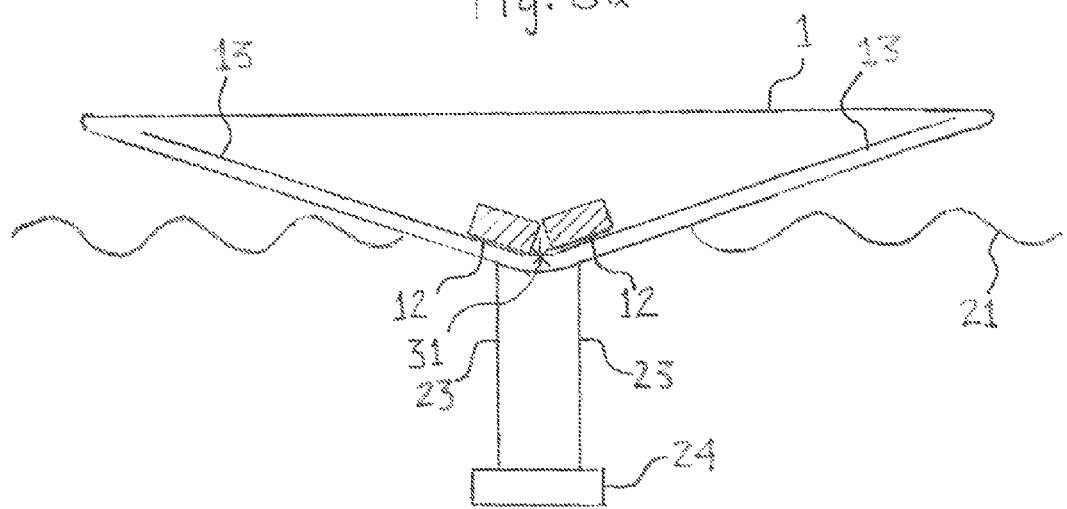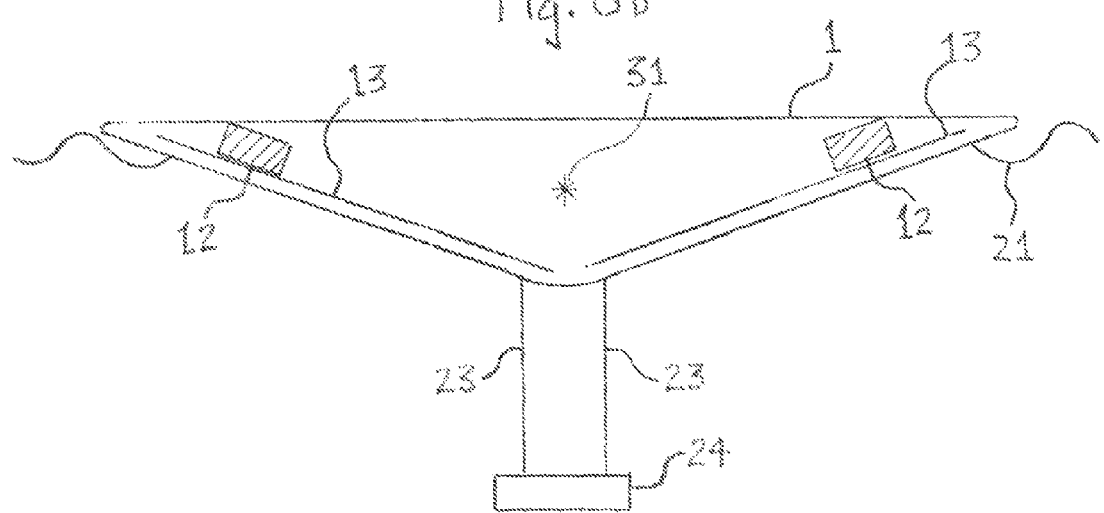

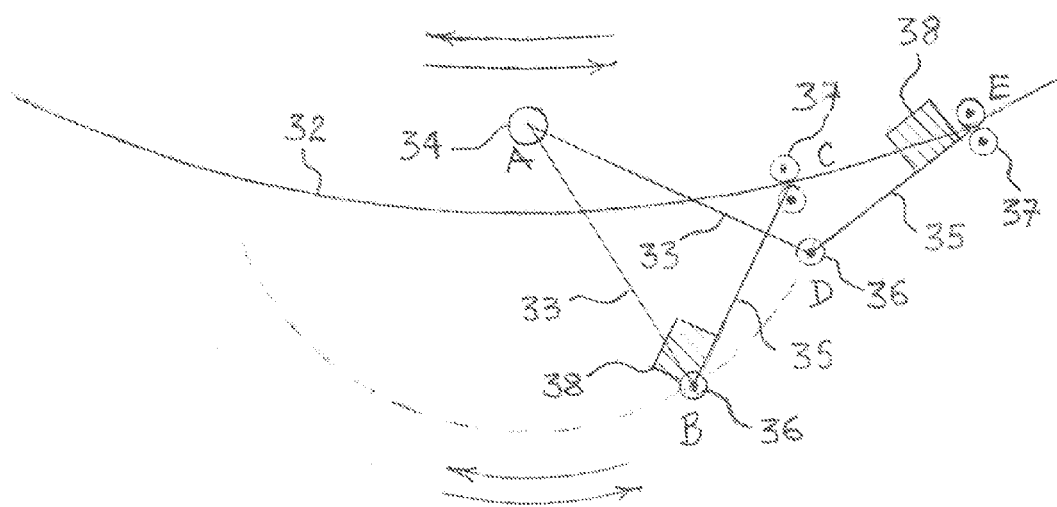
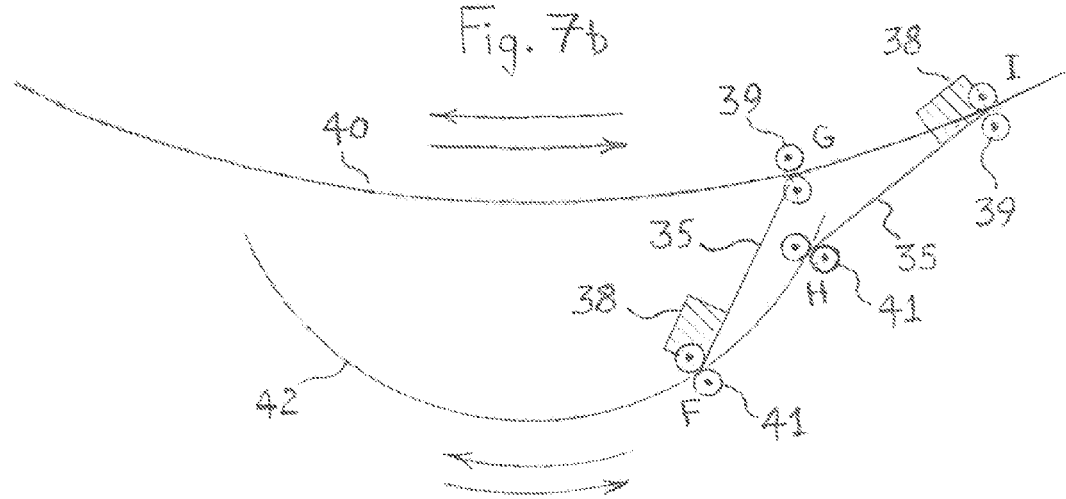

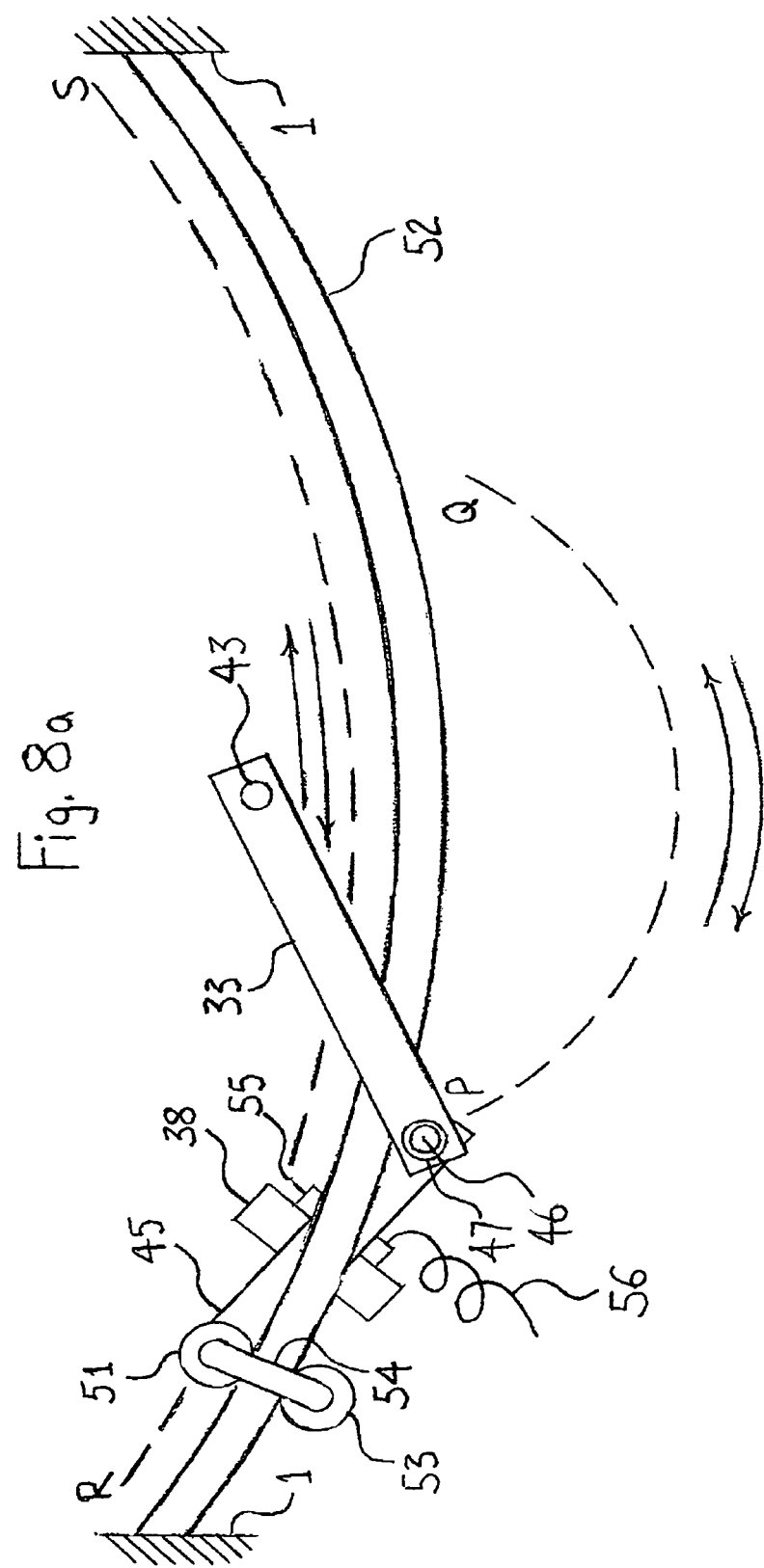

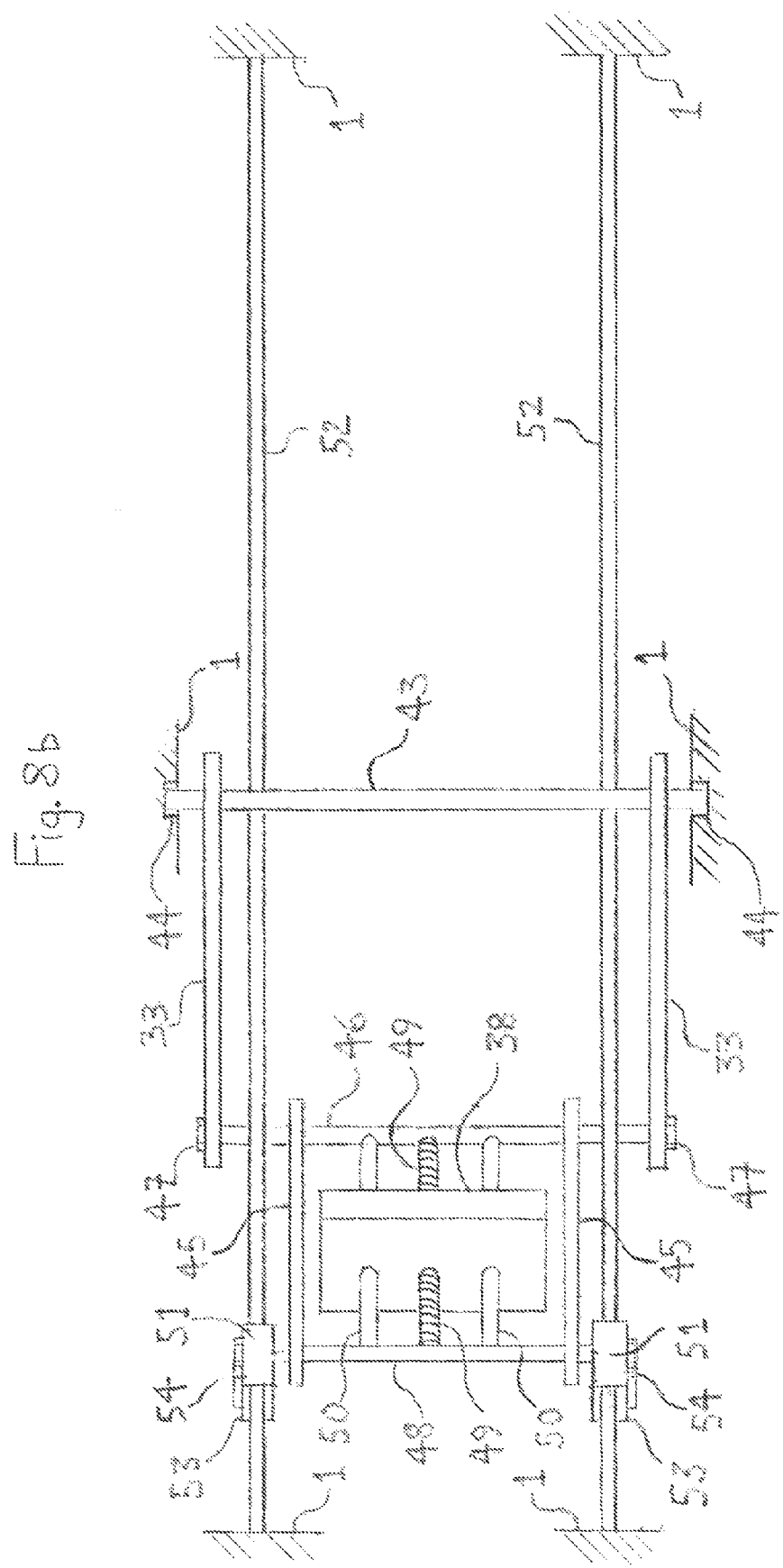

DYNAMICALLY TUNED WAVE ENERGY CONVERTER

RELATED APPLICATIONS

This application is based on the wave energy converter (WEC) disclosed in my patent application GB 0916518.4 of 18 Sep. 2009, which is incorporated by reference.

This application uses the pendulums disclosed in my patent application GB 1013675.2 of 16 Aug. 2010, which is incorporated by reference.

FIELD OF INVENTION

The described system is intended to capture wave energy and to convert it to electrical energy at high efficiency and with low life-cycle costs.

BACKGROUND OF INVENTION

Cited Patents

U.S. Pat. No. 4,392,061 7/1983 Dubois et al
U.S. Pat. No. 7,755,224 3/2008 Beane An estimated 1500 wave energy patents have been issued worldwide since the first such patent was issued in 1799. In 2009 around 20 commercial prototypes were under development, but no commercially successful wave energy system is yet in operation. The main problems are:

Low efficiency of energy capture and conversion
High life-cycle costs
Storm damage risk
Environmental impact Low efficiency of conversion of available wave energy arises from:

Poor location. Ocean waves are a mixture of long-distance storm swells and local wind-waves. Waves are reflected from shorelines, refracted around headlands and distorted and attenuated by shallows. The combination of these effects randomizes wave period and wave height in many near-shore locations, making efficient energy capture in such locations impossible. Although multiple storms and local winds can also randomize waves in off-shore locations, at most times a dominant swell can be measured and predicted. Such swells are routinely identified and tracked by wave buoys and by satellite observation.

Vector restriction. Wave energy is in two vectors: vertical heave energy and horizontal surge energy. Heave energy is captured by bobbing devices and surge energy is captured by vertical flapping devices. Such devices are limited to capturing no more than 50% of available wave energy.

Wave-bridging. A pitching floating vessel captures potentially both surge and heave vectors of wave energy but is subject to wave-bridging. Maximum pitching motion is achieved when a floating vessel is exactly the same length as the face of the incident wave ie half a wavelength. If the vessel is shorter than this it tends towards less efficient bobbing. If the vessel is longer than this it starts to bridge adjacent wave peaks and as vessel length increase it pitches progressively less. A vessel that is optimized to pitch at long wave-lengths is inefficient at short wave-lengths and vice versa. An obvious but incomplete solution is to design the vessel to pitch at the frequency that delivers most energy over the year. But if the wave period is two seconds below the period at which the vessel immersed length is optimum then the reduction in efficiency is around 80%. If the wave period is two seconds above the period at which the vessel immersed length is optimum, the reduction in efficiency is around 20%.

Non-resonance. Non-resonant interaction between wave energy devices and ocean waves is highly inefficient. In the worst case the device and the incident wave become opposed so that energy transfer is reversed. A common strategy is to design the wave energy device to be resonant at the wave frequency that delivers the most energy over a year. However, wave frequency varies widely over time so that this strategy is only partly effective. Another strategy is to force the phase of the wave energy device by intermittently braking or by intermittently raising the impedance of the power take-off system. Phase-forcing is only partly effective in raising efficiency because it works by stopping the transfer of energy.

Restricted bandwidth. A fully tunable resonant WEC is desirable. But the range of frequencies of ocean waves is wide: for example, over 99% of the wave energy spectrum of the North Atlantic spans periods between 3 seconds and 20 seconds. A rational design of WEC does not attempt to capture the entire wave energy spectrum because the cost of capturing the infrequent top and bottom percentiles of wave energy is uneconomic. The bandwidth limits can be stretched if the response of the WEC is non-linear with respect to wave energy, meaning that the WEC amplifies its response to low-energy waves and mutes its response to high-energy waves. If 95% of the wave energy spectrum is targeted for capture then a range of around 5 to 16 seconds is appropriate. The equation governing the frequency of oscillation of a floating vessel adds the effects of mass and added mass. Variation in only one of these terms does not suffice to enable a wide range of pitching periods. For example, a long vessel with a large water-plane cannot in any practical way be made to pitch rapidly only by moving weights on the vessel.

Radiation losses. Wave energy can be extracted from the relative motion of a small floating body and a large floating body. The assumption is easily made that the large body acts like a fixed platform. This is wrong since the large body is always moving although at a frequency that is different from the smaller body and so is radiating energy into the surrounding sea. Such designs have reduced efficiency. There can be similar losses from tether systems.

Tuning losses. Where dynamic tuning is implemented there will be losses due to slow or inefficient tuning and the energy absorbed in tuning, for example, in moving ballast masses.

Conversion losses. These increase with the number of stages involved in converting from relative motion to transmitted electrical energy and where any stage involves gas compression, for example, most hydraulic systems, significant energy will be dissipated as heat. Good electrical generation efficiency requires that slow and varying wave motion is translated to fast and uniform movement of a conductor through a magnetic flux.

Transmission losses. These are reduced by limiting the distance from wave energy converter to the main grid and by transmitting power at high voltage.

As a result of the factors listed above, the efficiency of conversion of wave energy to electrical power for most described WECs is low: it is estimated that only a few devices achieve efficiencies above 15%.

High life-cycle costs arise from:

High capital costs. These will be high if expensive materials or unusual shapes or construction methods are required, if the device is complex or if major under-sea work is required, for example to build a fixed platform. Excessive unconstrained side stresses on operating mechanisms may require costly over-design to avoid wear and damage.

High operating costs. Many proposed WECs have unprotected external moving parts. In the marine environment these are likely to corrode, erode, distort, leak and jam, reducing performance and requiring frequent maintenance. Maintenance costs and the costs of downtime will be high if the device is prone to failure and especially if it must be towed to port for repair. Location of such devices is limited by the availability of adequately large or well-equipped local ports. Storm damage and rogue waves are a major risk for wave energy devices. Rogue waves occur when storm swells are superimposed, creating waves that can be double the prevailing wave height and therefore four times the prevailing wave energy. An example called the Draupner Wave was recorded at 26.6 m height in the North Sea in January 1995. In a year the peak wave energy may be 50× the average. Over the life of a WEC it may encounter waves with energies as much as 200× the average. Any fixed, non-submersible device is vulnerable and can be protected only by costly over-design.

As an example of storm risk, in early 2010 a $5 m wave energy device using a floating platform to carry an oscillating water-column air turbine was sunk by heavy seas just a few weeks after being installed (Oceanlinx at Port Kembla, Australia).

Environmental impacts principally arise from visually obtrusive structures and interference with sea-lanes and fishing and breeding grounds, especially close to shore. This limits the commercial scope for near-shore structures.

It follows from the above points that a commercially viable WEC should employ a floating vessel rather than a device fixed rigidly to the sea-bed and that the WEC should be designed to:

Capture high-energy swell in off-shore locations facing distant ocean storms. Suitable locations include the Pacific coast of the USA, the Atlantic coast of Europe and the western coasts of Australia and New Zealand. The preferred location is where the sea is sufficiently deep to avoid attenuating high-energy swells but not so deep that the cost of anchoring and cabling is excessive: around 60-90 m. The distance from shore should be sufficient to avoid near-shore environmental concerns but not so far that cabling cost is excessive: around 1 to 4 km.

Capture pitching motion and suppress rolling and yawing motion.

Allow dynamic adjustment of the immersed rigid length of the pitching floating vessel where dynamic means continuous and adaptive in real time.

Allow dynamic tuning to the frequency of the swell to achieve resonance in the typical range of frequency of high-energy swells: around 5 to 16 seconds period.

Enable such dynamic tuning by using wave sensors and a control system to anticipate and act upon wave conditions.

Balance the incremental gain from increased capacity to absorb wave energy against the associated incremental cost over the life of the WEC.

Avoid external moving parts that cannot be effectively sealed from the sea.

Enable in-situ repair.

Allow submersion to avoid extreme waves.

Be sufficiently compact and low-profile to avoid visual obtrusion.

Use mechanical in preference to pneumatic or hydraulic means to convert motion to electric power.

Avoidance of vulnerable external moving parts points to a fully sealed vessel enclosing a pendulum and taking power from the relative motion of pendulum and vessel. For the highest efficiency of wave energy conversion, the pendulum should also be dynamically tunable.

Avoidance of costly and obtrusive structures requires that the pendulum is not a conventional simple pendulum since this requires a vessel around 70 m high to permit resonance at 16 seconds. Instead a compact pendulum must be used. This is defined as a pendulum in which the pendulum mass follows a circular path in the vertical plane but requires a vertical distance that is significantly less than a conventional pendulum.

Prior art describes many WECs employing pitching vessels and also many WECs using pendulums. However a combination of pitching vessel and pendulum is less common and there is little prior art that describes WECs with dynamic tuning of both pitching vessel and pendulum.

There is no discovered prior art that describes a WEC that controls wave-bridging which is a defining problem of pitching devices, nor prior art that describes simultaneous modification of ballast distribution and water-plane area to achieve a wide range of pitching periods, nor prior art that describes how to tune a WEC to the wide range of pitching periods that characterize ocean swells without requiring structures of excessive height nor prior art that describes a dynamically tuned pitching WEC with suppression of roll and yaw forces that may damage the interior system of the WEC nor prior art that describes a dynamically tuned WEC that submerges autonomously or on remote command to avoid extreme seas.

SUMMARY DESCRIPTION

The present invention comprises:

A floating tethered vessel arranged to pitch on ocean swell.

External buoys able to capture and transmit wave data.

Inside the vessel, ballast masses and means to move them.

A v-shaped hull that combined with variable draft allows the rigid immersed length of the vessel to be varied.

Means for suppressing roll and yaw of the vessel.

Inside the vessel a compact pendulum.

Inside the vessel a means for converting the relative motion of the compact pendulum and the vessel to electrical power.

Inside the vessel a means for control of the WEC and for external communication.

By moving ballast masses the mass moment of inertia about the center of gravity can be varied and so the period of oscillation of the floating vessel can be varied.

By pumping seawater ballast the draft of the vessel can be varied and the water-plane can be varied and the added mass moment of inertia in the pitching plane about the center of gravity can be varied and so the period of pitching oscillation of the floating vessel can be varied. The effect of draft on vessel pitching period is enhanced by giving the vessel a hull with a v-shape in the pitching plane.

The beam section of the vessel may be uniformly flat, this being the shape that is easiest to fabricate. The bow may be pointed to reduce wave-slamming but the risk of wave-slamming is reduced by a control system that de-tunes the WEC in heavy seas and shuts down the WEC and submerges it in extreme seas.

The beam cross-section may vary uniformly from flat at the bow and stern to v-shaped in the middle of the vessel. This hull shape further enhances pitching response but at the price of greater instability The vessel is tethered from the bow or from near the bow by one or more mooring lines so that it tends to align with the dominant swell. The mooring lines are attached to the seabed by means that do not unduly influence the pitching period of the floating vessel. Such means may include attaching the mooring lines to an anchored, submerged, neutrally buoyant platform configured to have a natural frequency that has a longer period than the longest period at which the WEC resonates.

Roll and yaw are suppressed to reduce potentially large and possibly catastrophic stresses created by sideways forces on the compact pendulum.

The vessel may have a width that is sufficient to bridge rolling waves. To enable deployment and removal of the WEC, a wide vessel must be in detachable segments. But when a pitching vessel absorbs wave energy the incident wave collapses and adjacent waves move in to fill the gap (wave-healing). As a result it is more efficient in use of resources to use a spaced array of vessels rather than a clustered group of vessels. The optimal spacing between vessels is around 2-3× the vessel width A preferred method is to connect the underside of the vessel rigidly to one or more submerged vertical anti-roll fins. One or more rigid vertical struts attached to the vessel underside may hold a single vertical fin below the keel. The single fin is at sufficient depth to be in substantially still water. Substantially still water is at 25% of the dominant swell wave-length. Assuming 10 seconds as the dominant swell period, the required depth of the fin is around 25 m. Allowing for the draft of the vessel and the height of the fin, the desirable length of the struts is around 20 m.

The single anti-roll fin and the required keel ballast may be integrated and streamlined in the pitching plane. To allow deployment and removal of the WEC, the damping fin and connecting struts may be detachable or hinged to fold under the vessel or the struts may be telescopic.

To suppress roll, the vessel may be attached rigidly at the axis of pitching to one or more transverse outriggers. Fixed at the end of each outrigger arm is a submerged horizontal heave plate.

Inside the vessel is one or more compact pendulums arranged to oscillate in the pitching plane.

Since the moving mass of the compact pendulum follows a circular path it behaves like a simple pendulum: to a close approximation, assuming non-extreme amplitudes and linear power take-off, the period of oscillation is dependent only on the circular radius and is independent of mass and amplitude. This simple behaviour makes dynamic control of the oscillation of the compact pendulum straightforward.

A simple pendulum resonant with a swell of 16 seconds period requires a pendulum arm of theoretical length 64 m. Allowing for the mass of the arm itself and the need to enclose the pendulum and protect it from side-forces, the implied WEC height is around 70 m. Such a structure would be costly, obtrusive, create problems of side-forces from both wind and waves and would be absurd when applied to average ocean swells that may persist at heights of no more than 3 m. The compact pendulum described in the present invention requires no more than 7 m height although the overall vessel height may be somewhat greater: this is 10% of the vertical height required by a simple pendulum The present invention describes dynamically tunable compact pendulums that employ tracked masses moving on circular tracks and masses moving on the second arm of folding pendulums. In order to resist side-forces the tracked masses use roller-coaster wheels: this is an arrangement of wheels commonly used on roller-coasters, that grips a track above, below and on both sides. In order to resist side-forces, the compact pendulum also uses one or more bracing rails to brace its moving parts: these are rails, fixed to the structure of the vessel and arranged to be congruent with the path of motion, to which moving parts (for example, a pendulum arm) are slidably connected.

BRIEF DESCRIPTION OF DRAWINGS

The accompanying drawings are schematic and not to scale:

FIG. 5a. Vessel: side view showing emptied ballast tanks and reduced water-plane.

FIG. 5b. Vessel: side view showing partly filled ballast tanks and increased water-plane.

FIG. 5c. Vessel: side view showing full ballast tanks and submerged vessel.

FIG. 6a. Vessel: side view showing solid ballast moved to the centre of gravity.

FIG. 6b. Vessel: side view showing solid ballast moved away from the center of gravity FIG. 7a. Compact pendulum combining tracked and folding pendulums: side view showing general arrangement.

FIG. 7b. Compact pendulum combining two tracked pendulums: side view showing general arrangement.

FIG. 8a. Compact pendulum combining tracked and folding pendulum: side view.

FIG. 8b. Compact pendulum combining tracked and folding pendulum: plan view.

DETAILED DESCRIPTION OF INVENTION

Overview

Figure 1A:
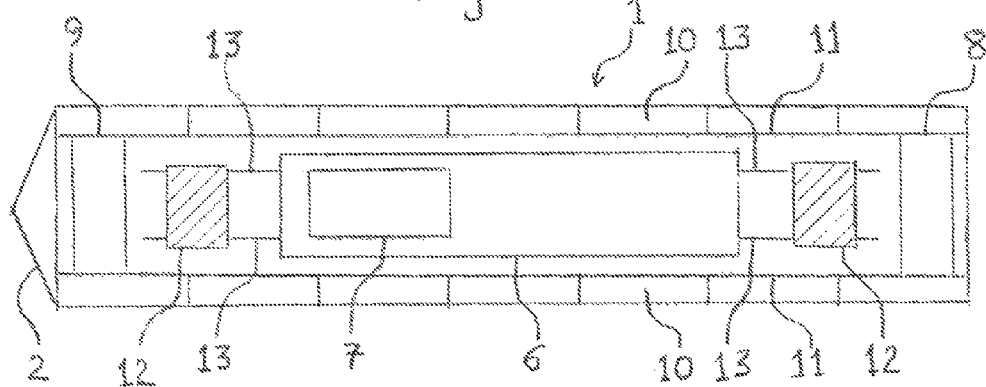
FIG. 1a. WEC system: plan view indicating the general arrangement of internal elements of the WEC vessel.

FIG. 1a is a plan view of the WEC system indicating the general arrangement of the internal elements of the WEC vessel. A floating WEC vessel (1) is tethered at the bow by a mooring fork (2) that attaches via a mooring line (3) to an anchor (4) on the seabed (5). Upstream of the vessel are one or more wave-monitoring buoys (not shown) also tethered by a mooring line to the seabed. The buoys transmit wave data to the WEC vessel (1). The vessel (1) contains the following: a compact pendulum unit (6), a power conversion unit (7), a control and communications module (8), an ancillaries module (9) containing batteries, pumps, lighting system and air-conditioning system and ballast tanks (10). The ballast tanks (10) are between the vessel outer hull and an inner hull (11). Two solid ballast masses (12) ride on a ballast rail (13) that is fixed to the floor of the vessel (1) and passes under the pendulum unit (6). The solid ballast masses (12) are pulled along the rails (13) by winches (not shown) that lie beneath the control module (8) and the ancillaries module (9). Other internal fixtures such as ladder, walkway and gantry are not shown.

The arrangement of the contents of the vessel (1) keeps the centre of gravity at the longitudinal center: this is then the pitching axis.

The mooring arrangement shown is highly simplified: it will be necessary to arrange mooring so that it does not substantially impede tuning of the vessel (1).

A single compact pendulum unit (6) is shown but it is possible to build a vessel (1) sufficiently large to carry several units: these may be arranged in series or in parallel.

Figure 1B:
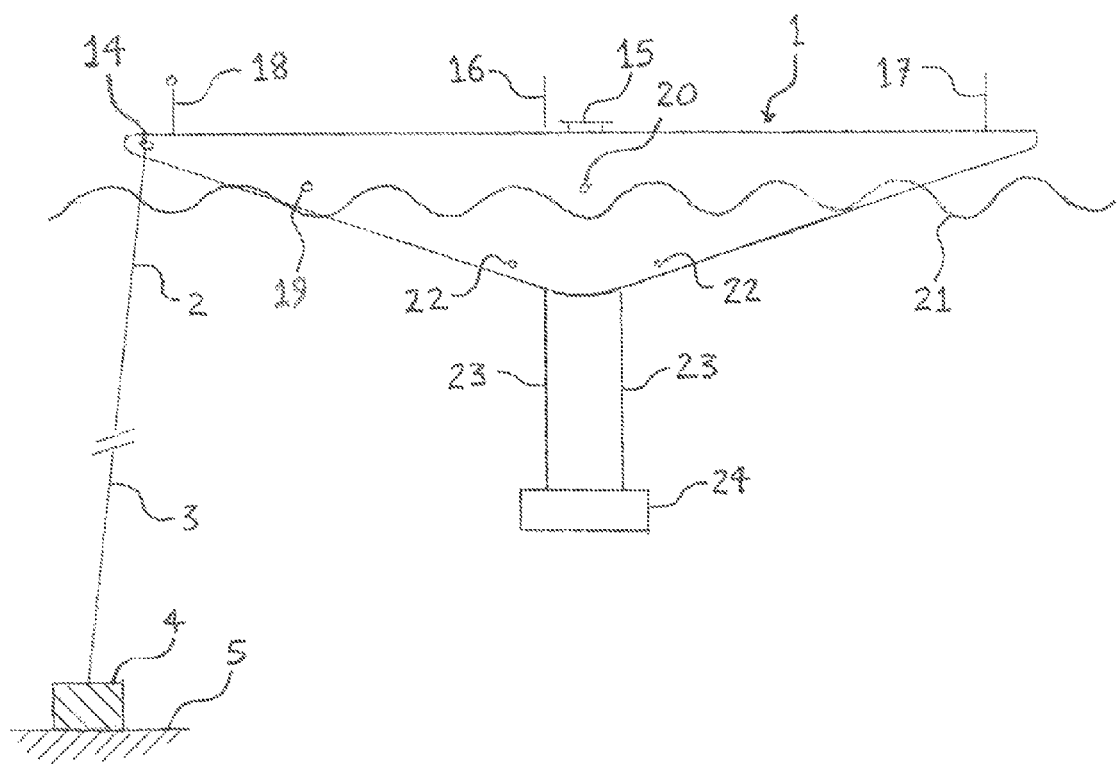
FIG. 1b. WEC system: side view indicating the external parts of the vessel.

FIG. 1b is a side view of the WEC system indicating the external parts of the vessel (1). The vessel (1) has a symmetrical longitudinal v-shape; the center of gravity and pitching axis is vertically aligned with the point of the v-shape.

The vessel (1) has minimal vulnerable external parts. The external parts comprise a mooring fork connector (14), a sealable port (15) for maintenance access, a snorkel (16) for air supply, an aerial for radio communication (17), a warning light and horn (18), bilge vents (19), a power cable connector (20) and, below the waterline (21), ballast vents (22) allowing the seawater ballast tanks to be filled and emptied.

Two rigid vertical fin struts (23) are attached to the keel of the vessel (1). The struts (23) are fixed at the lower end to a vertical anti-roll fin (24).

The vessel (1) is constructed from steel coated in an anti-corrosion layer. It is also possible to use other materials such as reinforced plastics or ferro-concrete. The lighter the material of construction the easier it is to vary the distribution of mass around the centre of gravity, so tuning the vessel. Because the weight of the vessel nearest to the centre of gravity has the least effect on tuning it is advantageous to construct the vessel using strong albeit heavy materials such as steel or ferro-concrete in the midship section and using less dense materials towards the bow and stern. Fiberglass is an ideal low density material: inexpensive, five times less dense than steel, corrosion-proof and with a fifty-year history of proven durability in marine conditions.

The general method of operation is as follows:
The mooring arrangement aligns the vessel (1) with the dominant incident swell.
The buoys (not shown) measure swell height, period and direction and transmit this data to the communication and control system (8). Sensors (not shown) inside the vessel (1) also measure the amplitude, period and phase of the vessel (1) and of the compact pendulum unit (6). The control system (8) computes the differences between the desired periods of oscillation of the vessel (1) and of the pendulum unit (6) and the actual periods and sends the commands required to remove this difference so that resonance is achieved with the incident swell. These commands are sent to the relevant actuators (not shown).

It is possible to operate the WEC without buoys. In this case the WEC relies on on-board sensors and information on predicted sea conditions transmitted from shore.

Hull Shape and Control of Wave-Bridging

Figure 2A:
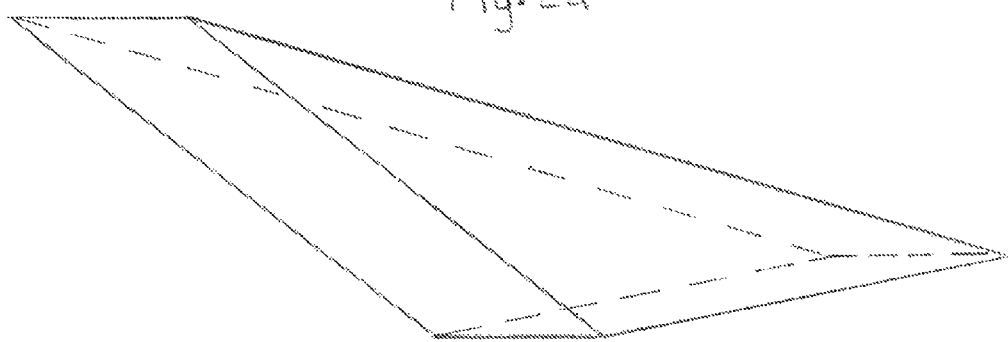
FIG. 2a. Vessel: isometric view from below of the v-shaped hull configuration.

FIG. 2a is an isometric view from below the hull, showing the v-shaped hull configuration of the vessel (1).

The purpose of the v-shaped hull is to provide:
A water-plane area varying strongly with draft. The water-plane area and geometry determine the moment of inertia of added mass and therefore influence the period of pitching of the vessel (1)
A variable immersed length, so controlling wave-bridging.

Figure 2B:
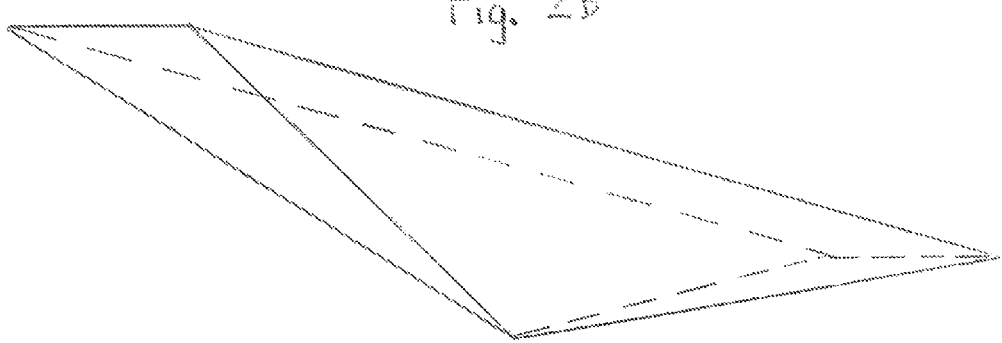
FIG. 2b. Vessel: isometric view from below of the v-shaped hull configuration with tapered beam.

FIG. 2b is an isometric view from below the hull, showing a v-shaped hull configuration with tapered beam.

By tapering the beam from a flat cross-section at the bow and stern to a v-shape at midships, the variation in water-plane with draft is accentuated although at the price of vessel stability.

It is possible to vary the hull configuration without changing the overall v-shape, for example by making the planar surfaces shown in FIGS. 2a and 2b concave or convex, or by rounding the edges of the hull.

It is also possible to attach fins to the vessel to change pitching behaviour. For example, transverse horizontal fins may be added. These may be tilted, may have an aerofoil cross-section and may contain seawater ballast tanks. Such fins catch additional wave energy, change the variation of water-plane with draft and alter buoyancy.

Figure 3A:
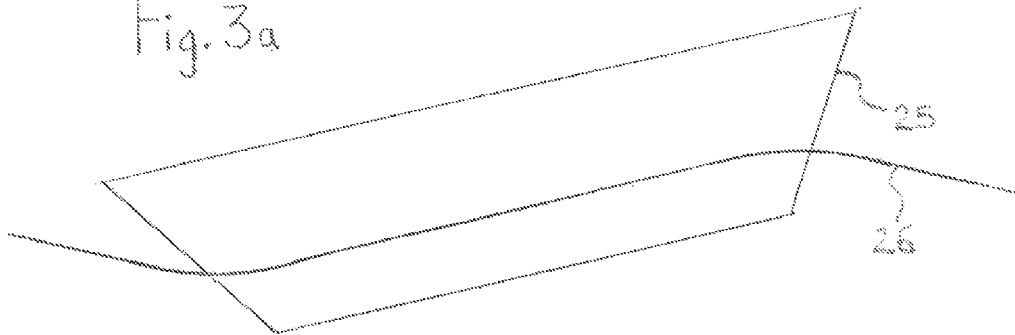
FIG. 3a. Side view of a pitching vessel with a swell wave-length equal to approximately 2× immersed length.
Figure 3B:
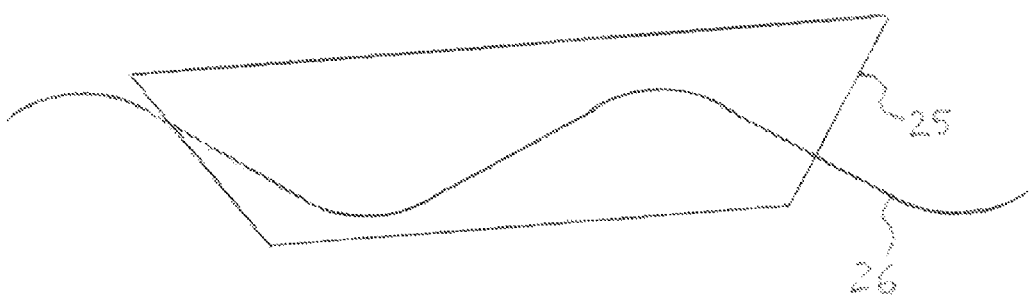
FIG. 3b. Side view of a pitching vessel with a swell wave-length equal to approximately 1× immersed length.
Figure 3C:
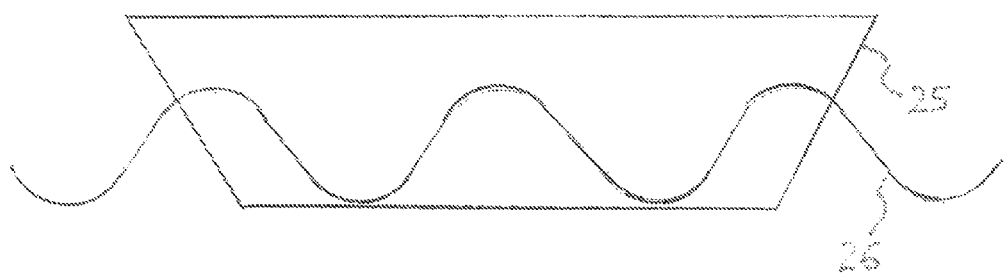
FIG. 3c. Side view of a pitching vessel with a swell wave-length equal to approximately 0.5× float length.

FIGS. 3a to 3c illustrate wave-bridging with views of a pitching floating vessel (25) of approximately fixed immersed length and draft, floating in a swell (26) of fixed height but variable period and therefore of variable wavelength.

FIG. 3a is a side view of a pitching vessel (25) floating on a swell (26) with wave-length equal to approximately 2× immersed length. In this case when one end of the vessel (25) is at the bottom of the swell (26), the other end of the vessel (25) is at the top of the swell (26) and vice versa. As a result pitching is maximized.

FIG. 3b is a side-view of a pitching vessel (25) floating on a swell (26) with wave-length equal to approximately 1× float length. In this case the vessel (25) is bridging between advancing and retreating faces of the swell (26) and so pitching is reduced.

FIG. 3c is a side-view of a pitching vessel (25) floating on a swell (26) with wave-length equal to approximately 0.5× float length. In this case the vessel (25) is bridging across the tops of the swell (26) and pitching is greatly reduced.

When the draft of the v-shaped hull of the WEC vessel (1) is increased, the immersed length increases and the vessel (1) pitches effectively on swells of longer period. When the draft of the v-shaped hull is reduced, the immersed length reduces and the vessel (1) pitches effectively on swells of shorter period.

Roll and Yaw Suppression

Suppression of roll and yaw is vital. In its absence, strong swells arriving from the side of the WEC vessel (1) with a period that matches the vessel's natural roll frequency will cause violent oscillation. Rolling oscillation of the large moving mass or masses inside the vessel (1) is likely to cause significant damage and may lead to catastrophic failure.

FIG. 1b gives a side-view of the vessel (1) with attached anti-roll fin (24). The fin (24) comprises a large flat vertical plate attached by two rigid vertical struts (23) to the keel of the vessel (1). The struts (23) are streamlined in the pitching plane and sufficiently long to hold the fin (24) in substantially still water. The thickness of the fin (24) can be varied to provide the desired keel ballast.

The size of the anti-roll fin is determined by the need to achieve a natural rolling period that is longer than the period characterizing the peak of the annual energy spectrum of rolling swell, probably around 10 seconds. The rolling period is increased by increasing the length of the struts, the mass of the fin and the volume of water entrained by the fin. The ideal fin has no mass: a massive fin reduces the tunable range of the pitching period of the vessel. Long struts also affect pitching tunability and so the struts should not be longer than required to hold the fin in still water.

To entrain as much water as possible for the lowest weight and the least drag in the pitching plane, the fin is a thin vertical steel plate of large area. The fin is sufficiently long to resist yawing motion.

The fin may have an entrainment rim (not shown) surrounding each vertical face. The effect of the rim is to increase the entrainment of water and so increase resistance to rolling motion. Channels (not shown) through the fin may be used to dissipate rolling motion as turbulence.

Figure 4A:
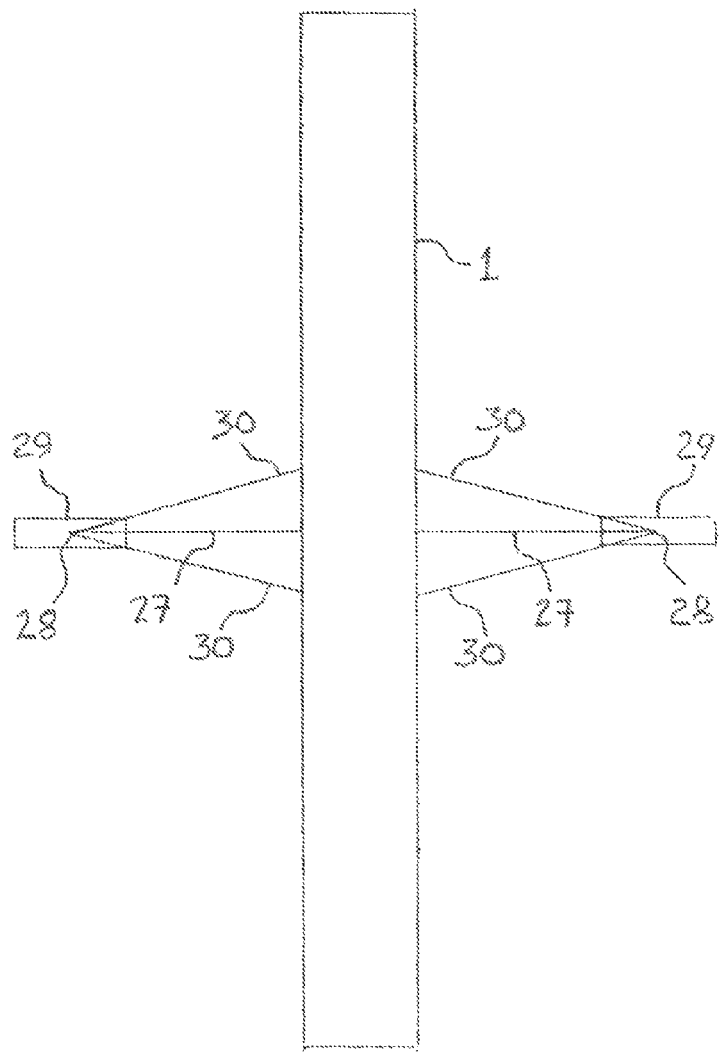
FIG. 4a. Roll-damping outrigger with heave plates: plan view

FIG. 4a gives a plan view of the WEC vessel (1) with two anti-roll outrigger arms (27) attached transversely to the vessel (1) at the pitching axis.

At the end of each outrigger arm (27) is fixed a vertical heave strut (28). Each strut (28) carries a submerged horizontal heave plate (29). The buoyancy of the heave plate (29) is sufficient to minimise vertical stress on the outrigger arm (27) when the vessel (1) is at rest. The outrigger arms (27) are reinforced by spars (30) on both sides and below. The heave plate (29) is relatively long in the transverse direction and short in the longitudinal direction in order to reduce the effect of the plate (29) on pitching.

Figure 4B:
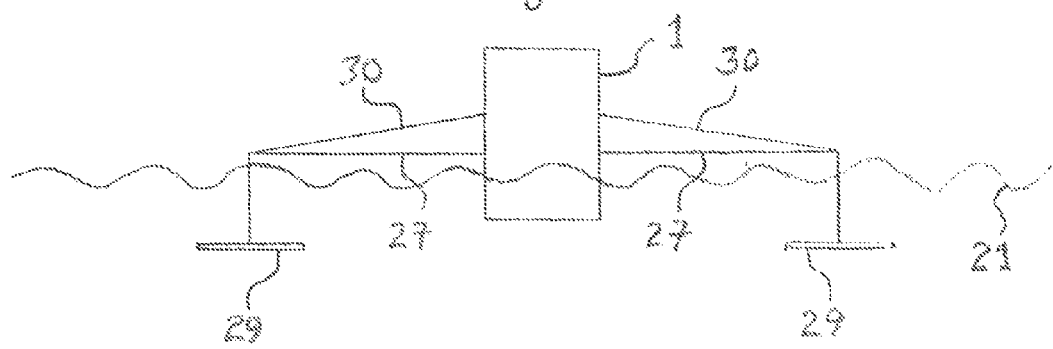
FIG. 4b. Roll-damping outrigger with heave plates: front view

FIG. 4b gives a front view of the same WEC vessel (1). The heave struts (28) are sufficiently long to keep the heave plates (29) below the waterline (21) when the draft of the vessel (1) is at a minimum.

The heave plate (29) may be perforated and have entraining rims to increase the damping effect.

The larger the area of the heave plate and the longer the outrigger arms, the longer the natural roll period of the vessel (1). By making the natural roll period higher than the roll period at the peak of the annual wave energy spectrum, rolling is suppressed.

Variable Ballast

FIG. 5a gives a side view of the WEC vessel 1), showing an array of ballast tanks (10). The array is symmetrical around the center of gravity (31) of the vessel (1). The outer tanks (10) are symmetrically empty and the lower central tanks (10) are shown full (cross-hatched). The waterline (21) is low and so the immersed length is short. By additionally emptying the central tanks (10), the vessel (1) achieves a minimum immersed length, enabling efficient pitching at the shortest pitching period.

FIG. 5b gives a side view of the vessel (1). The outer ballast tanks (10) are shown full (cross-hatched) and disposed symmetrically about the center of gravity (31). The waterline (21) is higher and the immersed length is increased, enabling more efficient pitching at longer pitching periods. The ballast tanks (10) are filled and emptied symmetrically about the center of gravity (31) in order to have the strongest effect on pitching period.

FIG. 5c gives a side view of the vessel (1), showing all ballast tanks (10) filled (cross-hatched) and the vessel (1) submerged. Full submersion is an essential feature to enable the WEC to escape extreme seas.

FIG. 6a gives a side view of the vessel (1), showing two solid ballast masses (12) moved close to the center of gravity (31). The two solid ballast masses (12) are equal in weight and are moved symmetrically about the centre of gravity to and from the ends of the vessel (1). The masses (12) are moved on ballast rails (13) fixed to the floor of the vessel (1). The masses (12) are pulled along the rails by electric winches (not shown). Other means may be used to move the masses, for example screw jacks or a rack and pinion system. When the masses (12) are close to the center of gravity (31) the vessel has a shorter pitching period.

FIG. 6b gives a side view of the vessel (1), showing the solid ballast masses 12) moved symmetrically away from the center of gravity (31). In this configuration the vessel has a longer pitching period.

The movement of the solid ballast masses is coordinated with the movement of seawater ballast masses to vary the pitching period of the vessel (1). As a result, the waterline (21) differs between FIGS. 6a and 6b.

The solid ballast masses (12) comprise modular masses fastened together.

Compact Pendulum

It is possible to construct a compact pendulum as a tracked pendulum or as a folding pendulum. The tracked pendulum is a pendulum mass moving on a track that has circular curvature in the vertical plane. In order to vary the period of the tracked pendulum it is necessary to change the circular radius of the track, for example by using a flexible track. The folding pendulum is a pendulum mass moving on a second pendulum arm that pivots on the end of a first pendulum arm and acts as an inverted pendulum. A path-forcing arrangement forces the second arm to move in concert with the first arm so that the angle from the vertical of the second arm is equal to and opposite from the angle from the vertical of the first arm. In this fashion the second arm is forced to follow a substantially circular path.

The present invention describes combinations of tracked and folding pendulums.

FIG. 7a gives a side view, highly simplified, of a compact pendulum that combines a tracked pendulum and a folding pendulum. This may be called a tracked and folding pendulum or TFP.

The path-forcing mechanism of the folding pendulum is a rigid track (32) with circular curvature in the vertical plane. The rigid first arm (33) of the folding pendulum is attached to, and turns on, a first pivot (34). The second arm of the folding pendulum is a rigid mass transfer frame (35) that is attached at one end to, and turns on, a second pivot (36) fixed at the end of the first arm (33) and is attached rotatably at the other end to a wheeled chassis (37) riding on and gripping the track (32). A pendulum mass (38) is slidably attached to the frame (35) and moves up and down it so varying the circular radius of motion of the mass (38) and therefore the period of oscillation. Two positions of the compact pendulum are shown labelled ABC and ADE, with different positions of the sliding mass (38).

FIG. 7b gives a side view, highly simplified, of a compact pendulum that combines two tracked pendulums. This may be called a double tracked pendulum or DTP.

A rigid mass transfer frame (35) is rotatably attached to a first wheeled chassis (39) on a first rigid curved track (40) and is also rotatably attached to a second wheeled chassis (41) on a second rigid curved track (42). A pendulum mass (38) is slidably attached to the frame (35) and moves up and down it so varying the circular radius of motion of the mass (38) and therefore the period of oscillation. Two positions of the compact pendulum are shown labeled FG and FH, with different positions of the sliding mass (38).

FIG. 8*a* gives a more detailed side view of a TFP.

FIG. 8*b* gives a plan view of the TFP shown in FIG. 8*a*.

FIGS. 8*a* and 8*b* show two parallel rigid first arms (33) of the folding pendulum fixed to and suspended from a first pivot shaft (43) that turns on first pivot bearings (44) fixed in the structure of the vessel (1). Two parallel rigid second arms (45) are fixed to a second pivot shaft (46) that turns on second pivot bearings (47) fixed at the ends of the first arms (33). The oscillating path of the second pivot shaft is shown by the dotted line PQ.

To enable the two pairs of arms to fold, the distance between the second pair of arms (45) is less than the distance between the first pair of arms (33). The second pair of arms (45) are formed into a mass transfer frame (35) by a rigid cross-member (48) attached to the ends of the second pair of arms (45). A threaded shaft (49) and two rigid slider arms (50) are fixed between the second pivot shaft (46) and the cross-member (48). Each end of the cross-member (48) acts as an axle for a riding wheel (51) riding on one of a pair of rigid parallel rails (52) curved in a circular arc in the vertical plane and fixed to the structure of the vessel (1).

The preferred arrangement is for the cross-member (48) to be rotatably attached to a roller-coaster wheel assembly on each rail (52). Such an assembly grips a rail above, below and at the sides. For simplicity the roller-coaster assembly is not shown but is indicated by a gripping wheel (53) connected to the riding wheel (51) by a link (54) between the wheel axles and located under the rail (52).

The axis of the circular arc of the rails (52) is vertically aligned with the axis of rotation of the first arms (33). The pair of rails (52) is positioned inside the pair of first arms (33) and outside the pair of second arms (45).

The pendulum mass (38) is arranged to slide on the two slider arms (50) and to move on the threaded shaft (49). The mass (38) is moved along the threaded shaft (49) by a traveling screw jack (55) attached to the mass (38). The screw jack is powered via a trailing cable (56)

The TFP operates as follows:
When the mass (38) is close to the rails (52) it follow the circular path of the rails (52) indicated by the dotted line RS. The folding pendulum is dragged behind. If the structure of the folding pendulum is weightless the mass behaves exactly like a tracked pendulum mass and oscillates with a period determined by the circular radius of the rails (52).
When the mass (38) is close to the end of the first arm (33) of the folding pendulum it follows the circular path of the end of the first arm (33) indicated by the dotted line PQ. The chassis and wheels and the members that support the mass (38) are dragged behind. If all these elements are weightless the mass behaves exactly like a simple pendulum mass at the end of the first arm (33) and oscillates with a period determined by the circular radius of the first arm (33).
If the mass (38) is large compared with the other elements described then at the two extremes of position of the mass (38) it will behave approximately as if all the other elements are weightless.
At intermediate positions on the slider arms (50) the mass (38) moves along a circular path that has a circular radius intermediate between the larger circular radius of the rails (52) and the smaller circular radius of the first arm (33). As a result the mass (38) oscillates at a period intermediate between a longer and a shorter period.

The compact pendulum must be protected against side-forces and this is done by using bracing rails (not shown). The motion of any point on the first arm (33) of the folding pendulum is along a fixed circular path. Therefore it is possible to attach the first arm (33) by sliding means to a rigid bracing rail congruent with the circular path of the first arm (33) and fixed to the structure of the vessel (1). Motion along the rails (52) is also on a fixed circular path. Therefore it is possible to link the wheeled chassis (37) by slidable means to a rigid bracing rail congruent with the circular path of the chassis (37) and fixed to the structure of the vessel (1).

The compact pendulum is equipped with brakes (not shown) to restrain the motion of the pendulum mass (38). Brakes are essential to protect the pendulum in heavy seas, by reducing large amplitude motion and, in extreme conditions, by locking the pendulum down. Lock-down is also needed during deployment or removal and during maintenance. Braking methods are well-known and may employ friction or hydraulic or pneumatic or electromagnetic systems. Lock-down may also use locking methods (not shown) that may include sliding pins, hinged pawls and similar known devices.

Power Take-Off and Conditioning

Means to convert relative motion to electrical power are well-known. Electricity is commonly generated by a rotary generator or may be generated by a linear generator. In the first case the slow reciprocating and often irregular motion of waves must be converted to fast, uniform rotation. There are three ways to do this:
- mechanical systems using devices such as cranks, flywheels, one-way clutches and gears
- hydraulic systems using devices such as rams, accumulators and rotary engines
- pneumatic systems using devices such as pistons and turbines On the grounds of efficiency and reliability mechanical systems are to be preferred; it is relevant that the wind-turbine industry has abandoned hydraulic systems and standardized on mechanical systems. However it is possible that new hydraulic technology currently under development may be suitable.

Power may be taken from the compact pendulum by several means including:
- Using the oscillation of the first arm (33) of a TFP.
- Using the rotation of riding wheels (51) on the rails (52) of a TFP or DTP.
- Fixing the rotor of a linear generator under the wheeled chassis (37) of a TFP or DTP and fixing the stator elements of a linear generator between the rails (52).
- Using the moving arms of a TFP to carry the rotor of a linear generator.

The electric power produced is conditioned for local storage and for transmission. The methods of doing this are well-known.

Figure 9A:
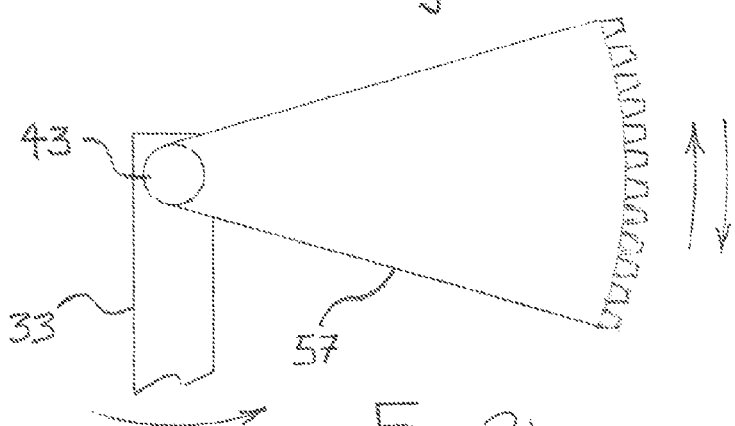
FIG. 9a. Power take-off: side view showing toothed wheel segment driven by pendulum shaft.

FIG. 9*a* gives a simplified side view of a power take-off from a TFP, showing a toothed wheel segment (57) fixed to the pivot shaft (43) of an oscillating first arm (33). The toothed segment (57) drives a gear train (not shown) and, by a known arrangement of one-way clutches and a flywheel, drives a rotary electrical generator.

Figure 9B:
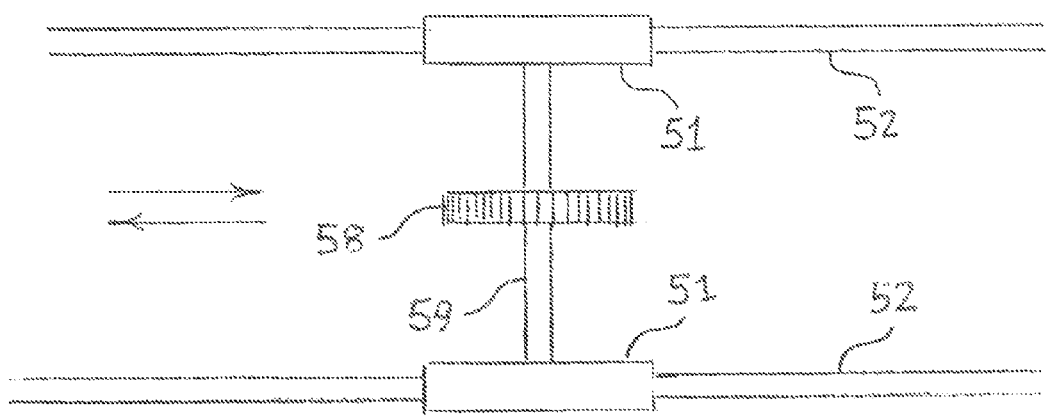
FIG. 9b. Power take-off: plan view showing toothed wheel driven by an axle riding on the pendulum track FIG. 9c. Power take-off: side view showing wheeled rotor moving on curved stator fixed to the pendulum track.

FIG. 9*b* gives a simplified plan view of the power take-off from a TFP or DTP, showing a toothed wheel (58) driven by an axle (58) riding on the rails (52). This motion drives a rotary generator as already described.

Figure 9C:
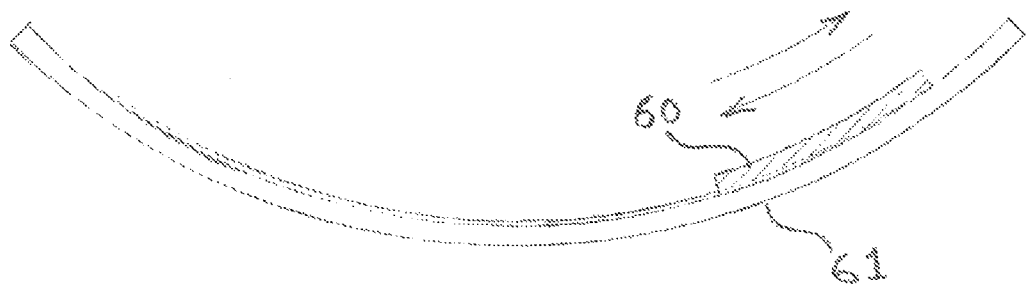

FIG. 9*c* gives a simplified side view of the power take-off from a TFP or DTP, showing a rigid rotor (60) curved in a circular arc and fixed to the underside of the wheeled chassis (36: not shown) and a rigid stator (61) curved in the same circular arc and fixed to the structure of the vessel (1) between parallel pendulum rails (52: not shown).

Control and Communication

The control system comprises sensors, computers, memory, software, data input devices, data display devices. communication links. actuators and power supplies for:

Monitoring wave conditions.

Monitoring system operation.

Dynamic control of vessel immersed length to control wave-bridging.

Dynamic control of oscillation of the pitching vessel to achieve resonance with the dominant swell.

Dynamic control of oscillation of the compact pendulum to achieve resonance with the dominant swell.

Identifying and reporting anomalies.

Detuning of the vessel and pendulum in heavy seas.

Autonomous and instructed submersion and lock-down in extreme seas and subsequent return to normal operation.

Maintaining a database of sea conditions and WEC performance that can be extracted for analysis.

The radio communication system comprises radio transmitter, radio receiver, aerial, power supply and input/output devices for:

Routine reporting from the WEC to a land-based or ship-based station.

Ad hoc reporting from the WEC when problems arise.

External communication to the WEC of predicted sea states.

External instructions to the WEC: for example, locking down prior to a maintenance visit.

Dynamic control of oscillation may be assisted by local real-time data on approaching swells: this may be provided using up-stream buoys with wave sensors and a radio link.

Data used from on-board sensors includes:

Period and amplitude of movement of vessel in pitch and roll vectors

The period and amplitude of movement of compact pendulum elements

Voltage and current from the electrical generator

Voltage of back-up batteries

Temperature, stress and vibration readings from critical elements of the WEC: for example the bearings of the compact pendulum.

Ballast tank levels.

Ballast pump pressures.

Motion and position of internal solid ballast masses.

Vessel draft.

The control system optimizes the response of the WEC to sea conditions using software that is both predictive (based on fixed formulae) and adaptive (learning from experience).

The control system computes the cost and benefit of tuning the WEC. If, for example, high swells at 12 seconds period are falling to low swells at 6 seconds, and it is probable, based on historical data or forecast data that the 6 second swell is anomalous or short-lived, then the system may conclude that the energy incurred in matching the system to 6 seconds is unjustified.

The required energy for tuning is drawn from generated power and from back-up batteries.

Maintenance

The present invention minimizes maintenance costs and downtime by:

Having all moving parts (apart from the mooring fork (2) sealed from the marine environment so as to minimize damage to the WEC.

Using roll suppression and pendulum bracing to avoid damage.

Submerging automatically or on remote command to avoid extreme seas and the related risk of damage.

Reporting anomalous operating conditions remotely, so enabling prompt attention to maintenance issues.

Enabling manual access to the WEC vessel (1) so that in situ maintenance may be performed on a routine and ad hoc basis.

In situ maintenance is made possible by the frequent prolonged calm periods in most oceans and the ability to forecast such calm periods.

Vessel Dimensions and Power

The desirable maximum and minimum immersed lengths of the v-shaped vessel (1) may be labeled Lmax and Lmin respectively. In order to pitch efficiently on 5 second swells, Lmin should ideally be 19.5 m and could be less than this but should not be more than 39 m. In order to pitch efficiently on 16 second swells, Lmax should ideally be 200 m and could be less than this but should not be more than 400 m. Lmax should accommodate the wave period at the peak of the local annual wave energy spectrum. This is likely to be around 10 seconds. The ideal length for pitching at 10 seconds is 78 m. At 11 seconds the ideal length for pitching is 94 m.

The height and length of the vessel must be at least sufficient to accommodate a single compact pendulum, power take-off, a walkway and gantry. The expected height of the compact pendulum unit is around 7 m and its expected length is around 25 m. It is therefore possible to arrange for Lmin to be around 30 m.

The width (beam) of the vessel (1) is partly determined by the width of the pendulum unit (6). This in turn is determined by the pendulum mass required to capture incident wave energy and the structure required to support this mass. The pendulum mass, as discussed later, is determined by optimizing the % of the annual wave energy spectrum captured. It is likely that pendulum units of up to around 5 m width can be easily constructed. The implied width of vessel is around 8 m and higher widths of vessel (1) will be approximate multiples of 8 m.

Based on reasonable assumptions, a vessel of 8 m beam will require a pendulum mass of around 180 tonnes and will have a capacity of 900 kilowatts (see below). For comparison, a modern locomotive engine weighs up to 120 tonnes, running on a track that is 1.4 m wide. By running the pendulum mass on a wide track (around 4 m wide), the height of the mass is limited and lateral and twisting stresses are reduced. Reduction of sideways stress on the pendulum system is essential if the WEC is to survive strong seas.

The wave energy captured as potential energy by the pendulum is given by:

$$Pm = EpPwBF \text{ Kilowatts} \qquad 1.$$

Where:

Pm is the potential energy of the pendulum mass

Ep is the efficiency of capture of wave energy as a fraction

Pw is the wave energy per m of wave-front

B is the vessel width in meters

F is a wave-healing factor

Wave energy depends on wave height and period as follows:

$$Pw = 0.48 Hw^2 Tw \text{ Kilowatts} \qquad 2.$$

Where:

Hw is the significant wave height in meter

Tw is the wave period in seconds.

Inserting equation 2 in equation 1 we get:

$$Pm = 0.48 EpHw^2 TwBF \text{ Kilowatts} \qquad 3.$$

The pendulum captures wave energy by lifting the pendulum mass through a vertical distance. The potential energy of the mass is:

$$Pm = MpHpg/1000Tp \text{ Kilowatts} \quad 4.$$

Where
Mp is the pendulum mass in kg
Hp is the lifted height in meters
Tp is the pendulum period in seconds
g is the gravitational constant (9.82 mpsec$^2$)
From equations 3 and 4 we get a solution for the pendulum mass:

$$Mp = 48.9 EpHw^2 TwTpBF/Hp \quad 5.$$

Assuming that:
Ep=0.75
Hw=5 m (representing the probable peak of the annual wave energy spectrum)
Tw=10 seconds (the probable peak of the annual wave energy spectrum)
Hp=5 m (by design, the maximum height that the pendulum mass is raised)
Tp=Tw
B=8 m
F=1.2
Then, inserting these values in equation 5:

$$Mp = 48.9 \times 0.75 \times 5 \times 100 \times 8 \times 1.2 = 176{,}000 kg = 176 tonnes \quad 6.$$

And the capacity of the WEC from equation 4 is:

$$Pm = 176 \times 5 \times 9.82/10 = 864 \text{ Kilowatts} \quad 7.$$

The dimensions of a feasible vessel are:
The length of the top of the vessel (1) is 90 m: this is the maximum immersed length.
The height of the vessel (1) from top to the bottom point of the V-shaped hull is 14 m. The draft varies between 5 m and 14 m.
The minimum immersed length is 30 m.
The pendulum unit with power take-off is located in a space that is 30 m long and 9 m high.
The width of the vessel (1) is 8 m.
The length of the struts (23) holding the anti-roll fin (24) is 20 m.
The anti-roll fin (24) is 10 m long×5 m high
The approximate geometry of the vessel is indicated in FIGS. 5 and 6.

Scope and Ramifications

The above description should not be construed as the only possible embodiment of the present invention. Other embodiments are possible using the ideas presented. For example, in further embodiments:
One or more compact pendulums operate inside the WEC vessel (1) in the rolling plane and so absorb rolling forces.
A second submerged vessel is fixed below the WEC vessel (1) and the submerged vessel contains a compact pendulum operating in the pitching plane in counter-phase to the compact pendulum (6) in the WEC vessel (1).
The WEC vessel (1) employs thrusters that optimize the orientation of the vessel (1), maximizing exposure to pitching swell and turning away from strong rolling swells.
The anti-roll fin is mounted on arms that slide up and down each side of the WEC vessel (1) and that can be locked in place, so easing deployment of the vessel (1).
The struts (23) supporting the anti-roll fin (24) are hollow and contain ballast tanks or movable solid ballast so that the disposition of mass from the center of gravity of the vessel (1) can be varied and so the pitching period can be varied.
The anti-roll fin (24) is hollow and contains ballast tanks or movable solid ballast so that the disposition of mass from the center of gravity of the vessel (1) can be varied and so the pitching period can be varied.
the WEC is deployed as an array of vessels with linked and shared control systems.

Advantages of Present Invention

The present invention offers the following advantages:
(a) The WEC is designed to capture the most concentrated wave energy resource: high-energy ocean swells.
(b) By using a pitching vessel, the WEC has access to 100% of wave energy.
(c) By using a tethered pitching vessel the high capital costs and the risks of storm-damage of a fixed platform are avoided.
(d) By combining a v-shaped hull with variable draft the WEC controls wave-bridging, so raising pitching efficiency.
(e) By combining a v-shaped hull with variable draft, the WEC varies its water-plane area and so varies its pitching period enabling resonance with the dominant swell and thereby improving efficiency.
(f) By moving solid ballast masses symmetrically about the center of gravity, the WEC varies its pitching period enabling resonance with the dominant swell and thereby improving efficiency.
(g) By combining the symmetrical movement of solid ballast mass, the symmetrical movement of seawater ballast mass and the modification of draft in combination with a v-shaped hull, the WEC vessel is tunable to a wide range of periods, so increasing energy capture from high-energy swells.
(h) By using dynamic tuning of both the vessel and the contained pendulum the WEC achieves resonance with ocean swells, so raising efficiency.
(i) By using intelligent tuning, using wave history and wave prediction to assess the value of a change in frequency, tuning losses are reduced.
(j) By using a compact pendulum, a costly and obtrusive structure is avoided.
(k) By using a deep-water anti-roll fin, roll and yaw are suppressed, so avoiding damage that could be catastrophic.
(l) By attaching to the WEC vessel one or more outriggers carrying heave plates, roll and yaw are suppressed, so avoiding damage that could be catastrophic.
(m) By allowing submersion of the WEC autonomously or by remote command, the WEC avoids damage by extreme seas that could be catastrophic.
(n) By using a WEC with no substantial external moving parts, wear and damage is avoided.
(o) By using bracing structures in the compact pendulum to counter sideways forces, wear and damage is reduced.
(p) By configuring the WEC to allow manual entry and operation, in situ maintenance can be carried out, so reducing costs.
(q) By monitoring the WEC system and transmitting information to a shore base, maintenance issues can be picked up and acted on promptly, so reducing avoidable cost and downtime.

Dubois' invention differs from the present invention under the headings (d), (e), (f), (g), (h), (i), (j), (k), (l), (m), (n), (o), (p), (q) above.

Beane's invention differs from the present invention under the headings (d), (e), (g), (i), (j), (k), (l), (m), (n), (o), (p), (q) above.

The invention claimed is:

1. A wave energy converter (hereinafter WEC), comprising:
   (a) a floating vessel arranged to pitch on ocean swell;
   (b) means for varying continuously the immersed length of said vessel in the pitching plane, whereby wave-bridging can be controlled and whereby the added mass moment of inertia of said vessel can be varied;
   (c) within said vessel, a plurality of ballast masses;
   (d) means for varying continuously the distance in the pitching plane of said ballast masses from the center of gravity of said vessel, whereby the mass moment of inertia of said vessel can be varied;
   (e) within said, vessel, a moving pendulum mass;
   (f) means for moving said pendulum mass along a circular path in the vertical plane, said means requiring a vertical space that is significantly less than the radius of said circular path at periods of oscillation typical of high-energy ocean swells, whereby the cost and obtrusiveness of the structure of said apparatus is reduced;
   (g) means for varying continuously the circular radius of said path;
   (h) means for converting the relative motion of said pendulum mass and said vessel to electrical power;
   whereby the oscillation period of said vessel and the oscillation period of said pendulum mass can be simultaneously and continuously varied to resonate with the ocean swell, so improving the efficiency of wave energy conversion.

2. A WEC as claimed in claim 1 wherein said means for varying continuously the immersed length comprises:
   (a) the hull of said vessel configured in a v-shape in the pitching plane;
   (b) a plurality of seawater ballast tanks in said vessel;
   (c) means to empty and fill said seawater ballast tanks selectively.

3. A WEC as claimed in claim 2 wherein said hull has a beam section that is flat at the bow and stem, v-shaped in the middle and tapered smoothly between bow, middle and stem.

4. A WEC as claimed in claim 1 wherein said means for varying continuously the distance of said ballast masses from the center of gravity of said vessel comprises:
   (a) a first solid ballast mass sliding on one or more rails fixed to the interior of said vessel and said rails extending from said center of gravity of to the bow of said vessel;
   (b) a second solid mass, identical to said first solid mass and sliding on one or more rails fixed to the interior of said vessel and said rails extending from said centre of gravity to the stem of said vessel;
   (c) means for moving said solid masses on said rails and holding said masses fixed on said rails, whereby said masses can be held equidistant at varying distances from said center of gravity;
   (d) a first array of seawater ballast tanks extending from said center to said bow;
   (e) a second array of seawater ballast tanks, symmetrical with respect to said first array about said center of gravity and extending from said center to said stern;
   (f) means to pump said seawater ballast tanks selectively, whereby seawater ballast can be held symmetrically about said center of gravity.

5. A WEC as claimed in claim 1 wherein:
   (a) a vertical fin is attached to the underside of said vessel by one or more rigid vertical struts;
   (b) said struts are streamlined in the pitching plane and sufficiently long to hold said fin in substantially still water,
   whereby rolling of said vessel is suppressed.

6. A WEC as claimed in claim 1 wherein:
   (a) one or more rigid transverse outriggers are attached to the sides of said vessel at the pitching axis;
   (b) each of said outriggers terminates in a rigid, submerged, horizontal heave plate,
   whereby rolling of said vessel is suppressed.

7. A WEC as claimed in claim 1 wherein said means for moving said pendulum mass along a circular path comprises:
   (a) a track curved into a circular arc in the vertical plane;
   (b) a wheeled chassis riding on said track and gripping said track;
   (c) said pendulum mass attached to said chassis.

8. A WEC as claimed in claim 1 wherein said means for moving said pendulum mass along a circular path comprises:
   (a) a first rigid pendulum arm suspended from and rotating on a fixed pivot;
   (b) a second rigid inverted pendulum arm fixed to and rotating on the end of said first arm;
   (c) a means for linking the motion of said second arm to the motion of said first arm so that the angle of deviation of said inverted second arm from the vertical is equal to and opposite to the angle of deviation of the first arm from the vertical;
   (d) said pendulum mass attached to said second arm.

9. A WEC as claimed in claim 8 wherein said means for linking the motions of said second arm and said first arm comprises a rotatable linkage between the end of said second arm and a wheeled chassis riding on a track curved into a circular arc in the vertical plane.

10. A WEC as claimed in claim 1 wherein said means for controlling continuously said circular radius comprises:
    (a) a first track curved in a circular arc in the vertical plane, said first track having a first circular radius;
    (b) means for ensuring said pendulum mass can follow a second circular path with a second circular radius;
    (c) means for translating said mass continuously between said first circular path and said second circular path, whereby the oscillation period of said mass can be varied continuously over a desired range.

11. A WEC as claimed in claim 10 wherein said means enabling said mass to follow said second circular path comprises:
    (a) a pendulum arm suspended from and rotating on a fixed pivot;
    (b) means for holding said mass at the end of said arm.

12. A WEC as claimed in claim 10 wherein said means enabling said mass to follow said second circular path comprises:
    (a) a second track curved in a circular arc in the vertical plane;
    (b) means for ensuring said mass can move along said second track.

13. A WEC as claimed in claim 10 wherein said means for translating said mass comprises:
    (a) said first track comprising two parallel first rails
    (b) said pendulum arm being free to move between said first parallel rails;
    (c) a rigid frame connecting said rails and said pendulum arm;

(d) said frame being rotatably fixed at one end to said means for ensuring said mass can move along said track;
(e) said frame being rotatably fixed at the other end to the end of said pendulum arm;
(f) said mass being slidably attached to said frame;
(g) means for continuously sliding said mass up and down said frame.

14. A pendulum as claimed in claim 10 wherein means for translating said mass comprises:
(a) said first curved track being in the form of first parallel rails;
(b) said second curved track being in the form of second parallel rails;
(c) a frame connecting said first rails and said second rails;
(d) said frame being rotatably fixed at one end to said means for ensuring said mass can move along said first track;
(e) said frame being rotatably fixed at the other end to said means for ensuring said mass can move along said second track;
(f) means for continuously sliding said mass up and down said frame.

15. A method of tuning a pendulum continuously to a wide range of frequencies within a compact vertical space by:
(a) moving a mass along a first circular path defined by a curved track with a circular radius able to generate the desired maximum period of oscillation of said mass;
(b) translating said mass continuously along a link between said first circular path and a second circular path with a circular radius able to generate the desired minimum period of oscillation of said mass.

16. A method as claimed in claim 15 wherein said second circular path is defined by the rotating motion of a pendulum arm about a fixed pivot.

17. A method as claimed in claim 15 wherein said second circular path is defined by a second curved track.

18. A method of tuning a pitching floating vessel continuously to a wide range of pitching frequencies by:
(a) varying the total amount of seawater ballast so that the draft of said vessel is varied and therefore the rigid immersed length is varied and therefore wave-bridging is controlled;
(b) varying the total amount of seawater ballast so that the draft of said vessel is varied and therefore the waterplane is varied and therefore the added mass moment of inertia is varied;
(c) constructing the hull of said vessel so that as the draft of said vessel is varied the immersed portion of said hull varies in cross-section from V-shaped to flat so that the added mass moment of inertia is varied;
(d) varying the amount, of seawater ballast symmetrically around the center of gravity of said vessel by selectively pumping a symmetrical array of ballast tanks so that the mass moment of inertia is varied;
(e) varying, the distance of solid ballast from the center of gravity of said vessel in a symmetrical manner so that the mass moment of inertia is varied.

* * * * *